Feb. 21, 1928.
J. M. WATERS
COFFEE BIN
Filed Jan. 8, 1927
1,660,284
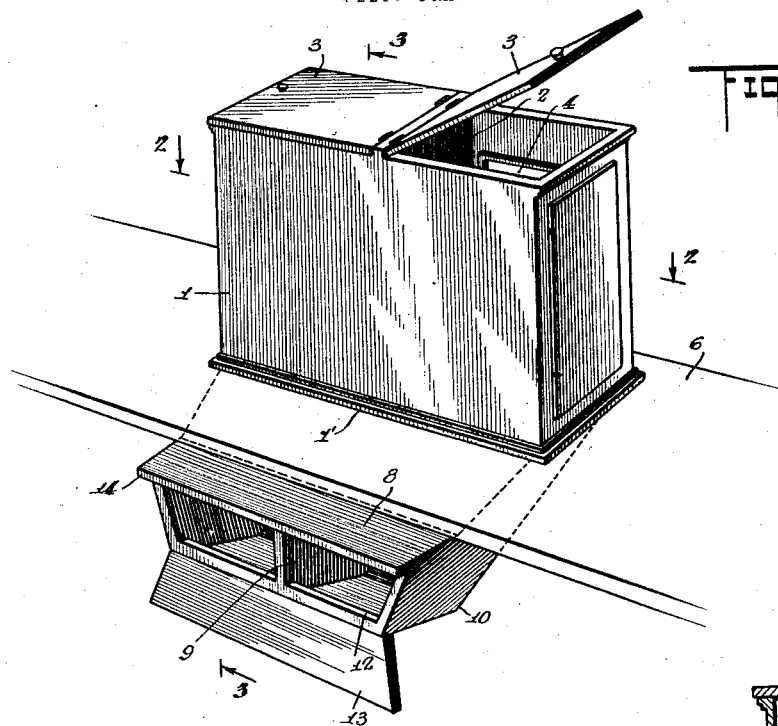
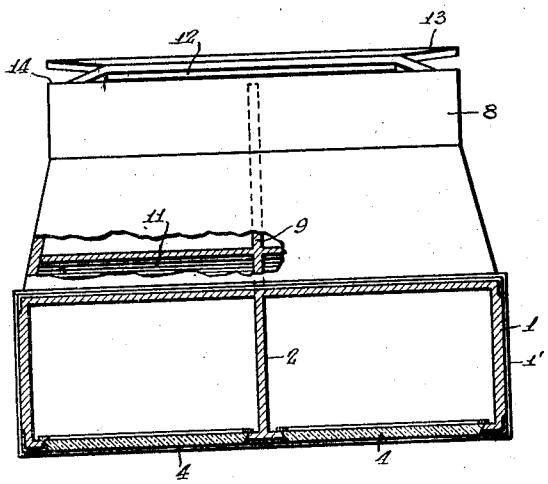
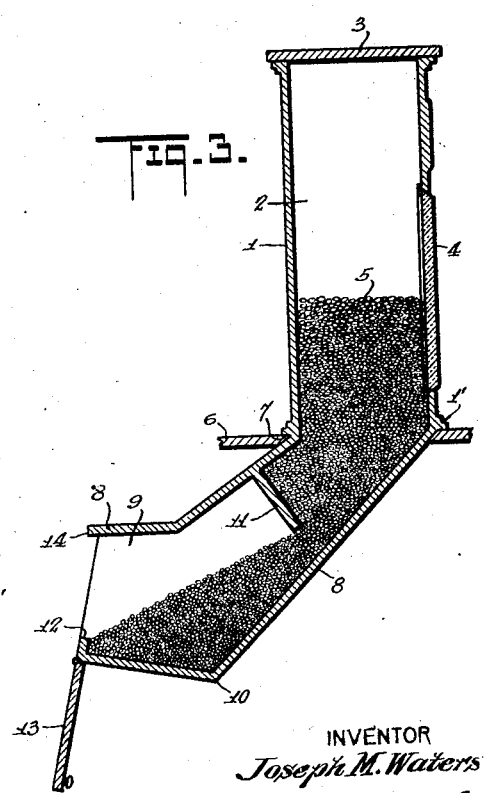
INVENTOR
Joseph M. Waters
BY Munn & Co.
ATTORNEY
WITNESSES Patented Feb. 21, 1928.

1,660,284

UNITED STATES PATENT OFFICE.

JOSEPH M. WATERS, OF JERSEY CITY, NEW JERSEY, ASSIGNOR TO THE GREAT ATLANTIC & PACIFIC TEA CO., OF JERSEY CITY, NEW JERSEY, A CORPORATION OF NEW JERSEY.

COFFEE BIN.

Application filed January 8, 1927. Serial No. 159,954.

This invention relates to coffee bins, and I use this title "coffee bin" because that is the primary use of the device although it may of course be used for any other granular material, and I wish to cover the device broadly for any use to which it can be put.

An object of the invention is to provide a coffee bin which functions as an ornamental and attractive receptacle for the coffee, which displays the coffee to the purchaser and which permits the convenient removal of any desired quantity of coffee from the lower portion of the bin so that there is never an accumulation of old coffee in the bin, as new coffee is always added to the top of the bin.

A further object is to provide a coffee bin which is especially adapted for use in retail stores and adapted to be supported on a counter or other support, making an attractive and ornamental display as well as a convenient device for the salesman.

A further object is to provide a coffee bin of this character in which any desired number of receptacles or compartments may be had for different kinds of coffee or other material, each receptacle having an outlet chute extending downwardly through the support and terminating at the rear of the support in convenient reach of the salesman.

A further object is to provide a bin of this character having an improved construction and arrangement of outlet chutes which serve to trap the coffee or other material, presenting always an approximately uniform amount of coffee to the scoop of the salesman and automatically controlling or regulating the feed of coffee or other material down the chute, said chute being provided with a hinged door or other closure so that the chute may be closed and opened at the convenience of the salesman.

With these and other objects in view, the invention consists in certain novel features of construction and combinations and arrangements of parts, which will be more fully hereinafter described and pointed out in the claim.

In the accompanying drawings—

Figure 1 is a perspective view showing my improved bin in operative position;

Figure 2 is a sectional plan view, the section being taken on the line 2—2 of Figure 1, and a portion of the upper wall of the chute broken away to illustrate the parts beneath;

Figure 3 is a view in vertical longitudinal section on the line 3—3 of Figure 1.

1 represents a receptacle which is shown of general rectangular form, although it may be of any shape desired and may be constructed of any material. This receptacle 1 is divided by a vertical partition 2 forming in the receptacle a pair of compartments, and each compartment is provided with a hinged cover or other closure 3 at the top thereof which may be opened when desired to pour coffee into the compartments.

I of course do not limit myself to any particular number of compartments as it is obvious that the bin may be made of any desired number, and it is also to be understood that I do not limit myself to any particular ornamentation employed as this is well within the scope of any designer. I do, however, preferably provide windows 4 in the front of each compartment through which the coffee 5 or other granular material can be observed by the customer.

The receptacle 1 is illustrated as supported upon a counter 6 having an opening 7 therein through which a chute 8, constituting a fixed part of the receptacle, is projected. The receptacle 1 is formed with a base bead or enlargement 1' which rests upon the counter 6 and supports the device positioned for use.

The chute 8 is divided by a longitudinal partition wall 9 which registers or alines with the partition wall 2 so that different grades or mixtures of coffee or other materials can be enclosed and dispensed from the device without mixing.

The chute 8 extends downwardly and rearwardly and is formed near its outer end with a bend or angle, indicated by the reference numeral 10, and a baffle plate 11 projects downwardly from the upper wall of the chute to a point as near the lower wall as may be desired so that the coffee flowing downwardly under this baffle wall into the angular or bent portion of the chute will present to the scoop of the salesman a quantity of coffee for ready removal as long as there is any coffe in the bin.

To further prevent the accidental escape of any of the coffee I preferably provide an upwardly projecting flange 12 on the lower wall of the extreme outlet end of the chute 8, and I also provide a hinged door or cover 13 which closes this outlet end of the chute. The upper wall of the chute at its outer end is formed with an overhanging ledge 14 under which the door or cover 13 fits when in closed position so as to prevent dust or dirt from falling into the chute.

So far as the function of the device is concerned it is of course only necessary that the angle 10 be in the lower wall of the chute, but in order to give a better shape to the chute and provide a larger opening or entrance for the scoop I have illustrated this bend as being in both the top and bottom walls of the chute.

It will thus be noted that when the device is in use it will present an ornamental and attractive appearance on the counter or other support so that the purchaser can see the coffee or other material and when purchasing the same the salesman will open the door or cover 13, insert his scoop into the chute and take out just as much coffee as he may need to complete the purchase, after which he will close the door or cover 13.

While I have illustrated what I believe to be a preferred embodiment of my invention it is obvious that various changes and alterations might be made in the general form of the parts described without departing from my invention and hence I do not limit myself to the precise details set forth but consider myself at liberty to make such changes and alterations as fairly fall within the spirit and scope of the appended claim.

I claim:

A bin, comprising a receptacle having an opening in its bottom and provided with a closure for the top, a chute secured to and supported by the receptacle and inclined downwardly in the direction of and beyond the rear face of the receptacle, said chute having its outlet end inclined upwardly and provided with an upwardly projecting flange on the bottom wall at its end, a baffle secured to and projecting from the top wall of the chute between the upwardly inclined outlet end and the connection of the chute with the receptacle, and a closure for the outlet end of the chute, the receptacle being adapted to rest on a counter over an opening therein, with the chute extending through the opening and under the counter in direction of the rear side thereof and in spaced relation thereto.

JOSEPH M. WATERS.